US008458101B2

(12) United States Patent
Wei et al.

(10) Patent No.: US 8,458,101 B2
(45) Date of Patent: Jun. 4, 2013

(54) METHOD FOR CONFIGURING INSTALLATION CAPACITIES OF HYBRID ENERGY GENERATION SYSTEM

(75) Inventors: Jung-Tzung Wei, Tainan County (TW); Yi-Chang Chen, Hsinchu (TW); Li-Ning Huang, Taipei (TW); Yu-Chang Chang, Taoyuan County (TW); Charng-Gen Lin, Taipei (TW)

(73) Assignees: Yuan Ze University, Taoyuan County (TW); Taiwan Green Productivity Foundation, Taipei County (TW); Advanced Control Systems, Inc., Taipei (TW); China Technical Consultants, Inc. Foundation, Taipei (TW)

(*) Notice: Subject to any disclaimer, the term of this patent is extended or adjusted under 35 U.S.C. 154(b) by 281 days.

(21) Appl. No.: 12/869,003

(22) Filed: Aug. 26, 2010

(65) Prior Publication Data

US 2011/0295610 A1 Dec. 1, 2011

(30) Foreign Application Priority Data

May 26, 2010 (TW) .............................. 99116894 A

(51) Int. Cl.
*G06Q 10/00* (2012.01)
*G06Q 17/00* (2012.01)

(52) U.S. Cl.
USPC .......................................... 705/412; 705/1.1

(58) Field of Classification Search
CPC ............................... G06Q 10/00; G06Q 17/00
USPC .................................................. 705/1.1, 412
See application file for complete search history.

(56) References Cited

U.S. PATENT DOCUMENTS 7,120,520 B2 * 10/2006 Seto et al. .................... 700/297
2007/0276547 A1 * 11/2007 Miller .......................... 700/295

OTHER PUBLICATIONS

Probability density function, Wolfram Mathworld.*

* cited by examiner

*Primary Examiner* — Heidi Riviere
(74) *Attorney, Agent, or Firm* — Rosenberg, Klein & Lee

(57) ABSTRACT

A method for installation capacities of a hybrid energy generation system is disclosed. The hybrid energy generation system may include a plurality of power systems. According to the environment factors and practical requirements of the installation site, the mechanism of the present invention may find the golden ratio of the installation capacities among the different power systems. Furthermore, the present invention may obtain the combination of installation capacities associated with the minimum recovery period, thereby further decreasing the installation cost and the efficiency of the hybrid energy generation system.

14 Claims, 6 Drawing Sheets

METHOD FOR CONFIGURING INSTALLATION CAPACITIES OF HYBRID ENERGY GENERATION SYSTEM

BACKGROUND OF THE INVENTION

1. Field of the Invention

The present invention relates to a method for configuring installation capacities; in particular, to a method for configuring installation capacities of a hybrid energy generation system.

2. Description of Related Art

Recently, the environmental issues are being more widely recognized and necessary solutions are being sought and appreciated. The advancement of energy utilizing efficiency and sustainable energy resources are the main important topics. Therefore, technologies related to renewable energy are being researched and developed. Wind power generation system and solar power generation system are the most mature renewable energy systems. In addition, fuel cell power generation system also demonstrates its future marketing potential in recent years.

Photovoltaic power generation systems have good, beneficial, environmentally-neutral efficacies, including no radioactive contamination, durability, and low maintenance cost, etc. As the energy conversion efficiency thereof has been enhanced gradually over years and influence of a substantial leap forward in semiconductor manufacturing, the production cost of the photovoltaic power generation system gradually decreases and is approaching the bounds of economic practicality. With regard to the wind power generation which has benefits such as no pollution and no damages to the ozone layer, it is receiving more attention and support recently. Additionally, the principal advantages of the fuel cell power generation system include high efficiency, almost zero pollution, and flexible configuration, etc. The research and development associated with this kind of renewable energy technology are sustained and rapidly growing nowadays.

However, as per the aforementioned power generation systems, there are shortcomings required to be overcome. For example, the weather condition is a main role in power generating of the photovoltaic power generation system and the wind power generation system, and the fuel cell has expensive cost of power generating. To solve the aforementioned issues, a hybrid energy generation system is proposed, wherein different characteristics of a variety of energy resources are used to compromise with each other and solve deficiencies of different energy resources. Moreover, in comparison with a single energy resource, the major efficacies of the hybrid energy generation system not only include low production cost, but also provide reliable power with high quality to users.

As per the configuration ratio of installation capacity for the hybrid energy generation system, the conventional technology in generating power with single energy source has proposed taking different generators model and looking for a combination with minimum generating cost. However, since the conventional technique does not consider the issues of actual power conversion efficiencies and environmental conditions of the installation site, the installation site would not have an optimized configuration with respect to the actual environmental conditions. Consequently, the conventional method for configuring the hybrid energy generation system is necessary to make improvements.

SUMMARY OF THE INVENTION

In view of the aforementioned objectives, the present invention provides a method for configuring installation capacities of a hybrid energy generation system, which may configure a installation capacity ratio of a installation site which meets actual requirements and environmental factors depending on the installation site for further decreasing the system establishing cost and providing a constant power source. The hybrid power generation system of the present invention is not restricted into any specific power systems. For example, the hybrid energy generation system might include a solar power generation system, a wind power generation system, a hydropower generation system, a geothermal power generation system, or a biomass power generation system. Furthermore, even a diesel engine power generation system or a thermal power generation system might be also included. The configuration of power generation systems would depend on the actual requirements of the installation sites.

To achieve the aforementioned objectives, an embodiment of a method for configuring installation capacities of a hybrid energy generation system in accordance with certain aspects of the present technique is disclosed. The proposed method is able to find a combination of installation capacities of the hybrid energy generation system, which includes a plurality of power systems. The method comprises the steps of: calculating a plurality of installation capacity coefficients and a plurality of maximum installation capacity corresponding to the plurality of power systems respectively. According to at least one environmental parameter, wherein the installation capacity coefficients are the ratios of the actual power generation with respect to the ideal power generation in accordance with the corresponding power systems.

Subsequently, the combination of the installation capacity is created according to a total power requirement, the maximum installation capacity, and the installation capacity coefficients. Moreover, a system cost and a recovery cost of the hybrid energy generation system would be obtained according to the combination of the installation capacity. The main purpose of creating the combination of the installation capacity is finding the plurality of installation capacity corresponding to the power systems respectively, so that a sum created by accumulating the product of each power system installation capacity coefficient respectively multiplying to the corresponding installation capacity is sufficient to meet the total power requirement.

Then, a recovery period would be defined according to the system cost and the recovery cost. An expected recovery period according to a user's requirement would be identified whether the expected recovery period is larger than the recovery period. As the expected recovery period is smaller than or equals to the recovery period, go back to the step of setting up the combination of the installation capacity to find another combination of the installation capacity. Herein, the recovery period indicates the time which the recovery cost is equal to the system cost. Then, identifying all combinations of the power generating source associates with the hybrid energy generation system to see if all combinations have been evaluated. As the result demonstrates the existence of the unprocessed combinations, then go back to execute the unprocessed combinations. While the result demonstrates that all combinations have already been processed, the combination of installation capacity with the minimum recovery period would be taken as the optimized configuration of the hybrid energy generation system.

Furthermore, the power systems could be combinations of at least any two of the following power generation systems such as a solar power generation system, a wind power generation a hydropower generation system, a geothermal power generation system, a biomass power system, a fuel cell power generation system, or an energy storage system (e.g., a rechargeable battery). The aforementioned environmental parameters might be a commanding height of an installation site or an area for the configuration of the power system without any shelter, so as to calculate a maximum installation capacity being available at the installation site. The environmental parameter may be either a combination or any one among a temperature, an illumination, a wind speed, a water flow, a water flow rate, a quantity of heat carrier, a geothermal temperature, and a biomass volume, so as to calculate each capacity coefficient with respect to the power systems accordingly. Of course, the present invention does not limit the kinds of power systems, the power system may be any kinds of power systems, including a solar power, a wind power, a fuel cell power a hydropower, a geothermal power, and a biomass power. It may be a conventional energy source, e.g., a diesel engine power, a thermal power or a nuclear power, each different kinds of power system would have an environmental parameter being necessary to be considered, so as to setup the maximum installation capacity and the capacity coefficient associated with the installation site for the power system.

Additionally, the aforementioned recovery cost is an energy saving cost or a selling profit. The energy saving cost represents a reduced electricity cost of a load which applies the power generated from the hybrid energy generation system, and the selling profit represents a cost that is achieved by selling the generated power from the hybrid energy generation system to an electrical power purchaser.

With respect to another proposal of the present invention, the generated power of the hybrid energy generation system may be partially self-consumed and the excess power may be sold for earning profit. Therefore, the installation capacity could be configured as two parts which are a self-consuming installation capacity and a selling installation capacity and the amount of each capacities could be altered each other with respect to a user's requirement.

A value of the combination of the self-consuming installation capacities and a value of the combination of the selling installation capacities would respectively calculated to find out the most efficient combination of each combination of installation capacities. The sum of the two most efficient combinations would be the total installation capacities. The steps of calculating the combination of the self-consuming installation capacities comprises: processing a combination of the self-consuming installation capacities according to the self-consuming installation capacity; the maximum installation capacities; the capacity coefficients; calculating a self-consuming system cost according to the combination of the self-consuming installation capacities; calculating an energy saving cost of a load which utilizes partial power generated from the hybrid energy generation system on the load according to the combination of the self-consuming installation capacities; dealing with a self-consuming recovery period according to the self-consuming system cost; the energy saving cost, wherein the self-consuming recovery period represents the time which is canceled by the system cost and the energy saving cost.

Furthermore, the steps include the followings. Determining an expected self-consuming recovery period according to the user's requirement whether is larger than the self-consuming recovery period. As the expected self-consuming recovery period is smaller than or equals to the self-consuming recovery period, the step of processing a combination of the self-consuming installation capacities would restart for determining whether all combinations of the self-consuming installation capacities associated with the hybrid energy generation system have been evaluated. As the identified result demonstrates unprocessed combinations, the step of processing a combination of the self-consuming installation capacities would be retaken.

The step of calculating the combination of the selling installation capacities comprises: processing a combination of the selling installation capacities according to the selling installation capacity, the maximum installation capacities, and the capacity coefficients; calculating a selling system cost according to the combination of the selling installation capacities; calculating a selling profit achieved from selling partial power generated from the hybrid energy generation system to a power purchaser according to the combination of the selling installation capacities; dealing with a selling recovery period according to the selling system cost and the profit, wherein the selling recovery period indicates the time which the recovery cost is equal to the system cost.

The steps further includes: determining an expected recovery period for the selling installation capacity according to the user's requirement whether is larger than the selling recovery period. As the expected recovery period for the selling installation capacity is smaller than or equals to the recovery period, the step of calculating the combination of the selling installation capacities would restart; determining whether all combinations of the selling installation capacity associated with the hybrid energy generation system have been evaluated; as the identified result demonstrates that there are combinations which have not been processed, go back to the step of calculating the combination of the selling installation capacities.

While all of the aforementioned combinations of the selling installation capacity and the combination of the self-consuming installation capacities have been processed, the overall installation capacity combination having the combination of the self-consuming installation capacities with the minimum recovery period and the combination of the selling installation capacities with the minimum recovery period would be the most optimized configuration of the hybrid energy generation system.

As per the aforementioned method for configuring installation capacities of the hybrid energy generation system, each power generating system would identify the optimized combination of the installation capacities. In addition, the hybrid energy generation system with the minimum installation cost would be able to promote the utilizing efficiency and the stability of power supplying In order to have further understanding regarding to the present invention, the following embodiments provide illustrations to facilitate the disclosure of the present invention.

BRIEF DESCRIPTION OF THE DRAWINGS

FIGS. 6-1 and 6-2 demonstrate a flowchart diagram of another embodiment associated with a method for configuring installation capacities of a hybrid energy generation system in accordance with the present invention.

DETAILED DESCRIPTION OF THE PREFERRED EMBODIMENTS

The aforementioned illustrations and following detailed descriptions are exemplary for the purpose of further explaining the scope of the present invention. Other objectives and advantages related to the present invention will be illustrated in the subsequent descriptions and appended drawings.

As per the aforementioned proposals, the present invention provides a method for configuring installation capacities of a hybrid energy generation system. One of the characteristics of the method is to be able to configure the installation capacity of each power system depending on a user's needs and environmental parameters of installation sites. To achieve the most cost-effective installation capacity configuration, a concept regarding to capacity coefficients is proposed according to the present invention. In the embodiment, a capacity coefficient $k_{cf}$ of a power system is defined as following:

$$k_{cf}=P/P_{rate}$$

Wherein, P is an actual power generation of the power system, and $P_{rate}$ is an ideal power generation of the power system.

Figure 1:
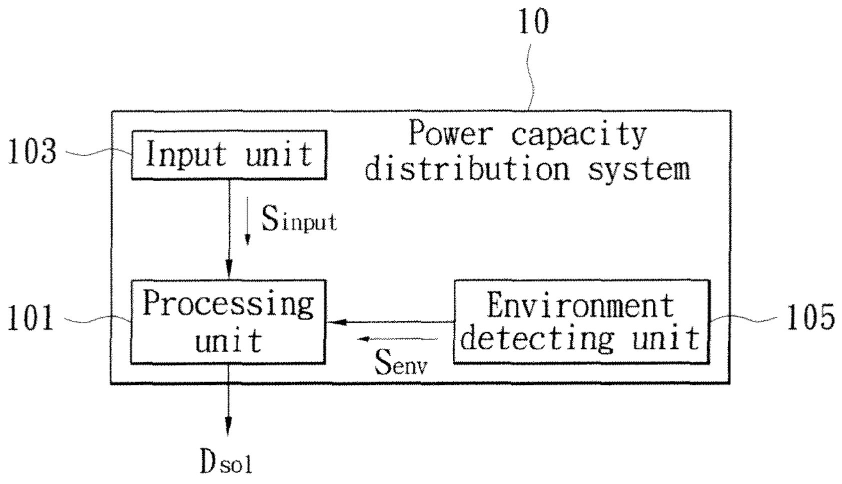
FIG. 1 demonstrates a block diagram of an embodiment associated with an installation capacity configuration system according to the present invention.
Figure 2:
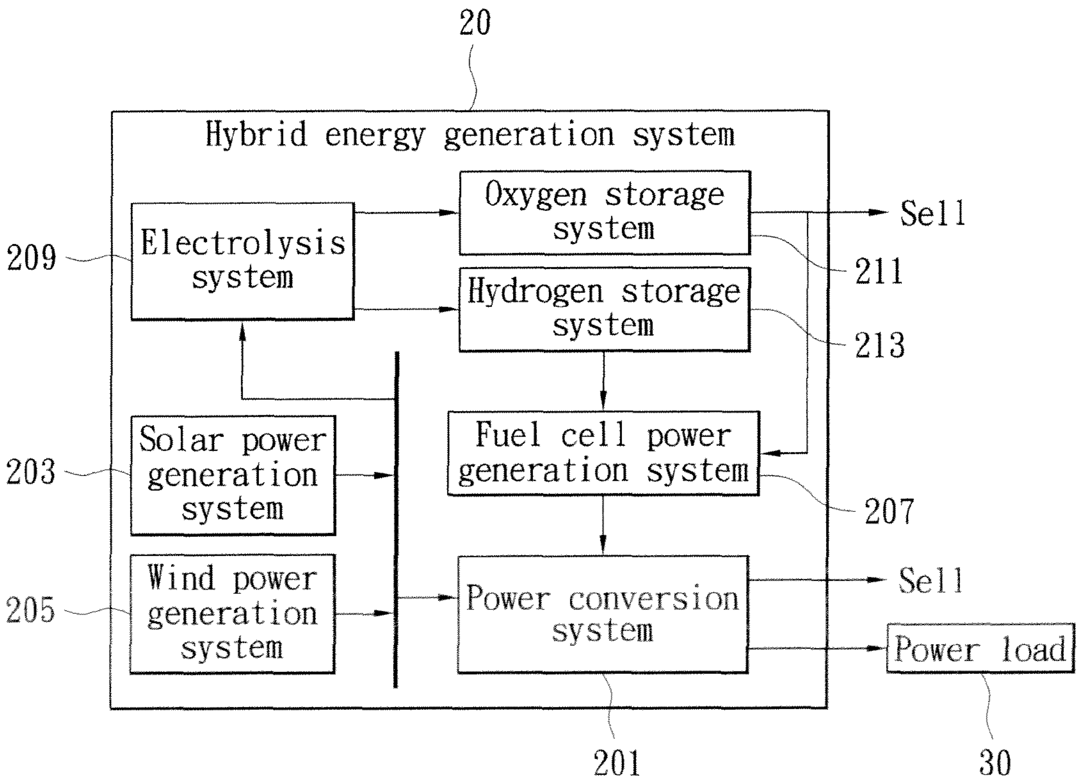
FIG. 2 demonstrates a block diagram of an embodiment associated with a hybrid energy generation system in accordance with the present invention.

Please refer to FIG. 1 and FIG. 2, in which a block diagram of an installation capacity configuration system 10 and a hybrid energy generation system 20 are demonstrated. The installation capacity configuration system 10 is designed to configure the installation capacities associated with the power systems included in the hybrid energy generation system 20. In the embodiment, the installation capacity configuration system 10 comprises a processing unit 101, an input unit 103, and an environment detecting unit 105. The processing unit 101 may design a combination of installation capacities $D_{sol}$ of the power systems inside the hybrid energy generation system 20 according to a detected environmental parameter $S_{env}$ detected by the environment detecting unit 105 and an input coefficient $S_{input}$ setup by a user (e.g., user's requirements or conditional setting).

Figure 3A:
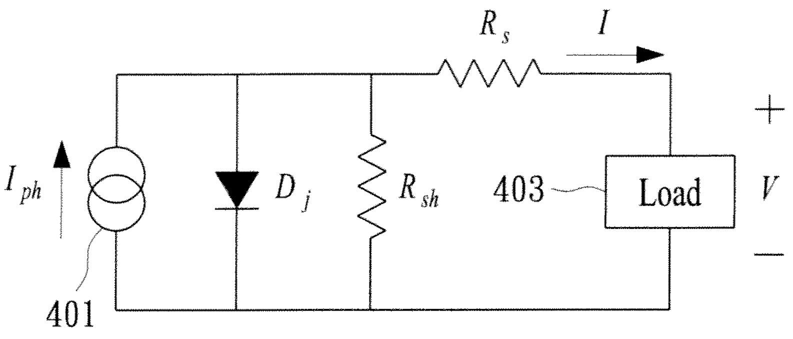
FIG. 3A demonstrates an equivalent circuit diagram of a solar power generation system according to the present invention.

The hybrid energy generation system 20 may include a plurality of power systems for power generating to supply a load 30 or to sell. In the embodiment, the hybrid energy generation system 20 includes the plurality of power systems which are a solar power generation system 203, a wind power generation system 205, and a fuel cell power generation system 207. The above-mentioned power systems are used for illustration but not limited thereto. Therefore, any renewable energy, traditional power sources, or power storage systems, e.g., rechargeable batteries, are energy sources candidates to apply in the hybrid energy generation system 20. In order to demonstrate the technical proposals, herein the solar power, the wind power, and the fuel cell are taken as an embodiment for illustrating, wherein the mathematical modules are as following:

(1) The Solar Power Generation System 203:

The solar cell is composed of a plurality of P-N semiconductors for directly converting the energy of sunlight into electricity by the photovoltaic effect. Therefore, the solar cell could supply a load as a power supply source. The equivalent circuit of the solar cell is demonstrated in the FIG. 3A, wherein $I_{ph}$ represents a photovoltaic current generated from a photovoltaic module 401 of the solar cell under the sunlight, $D_j$ represents a P-N diode, $R_s$ and $R_{sh}$ respectively represents an equivalent resistors in series and an equivalent resistors in parallel, V and I represents an output voltage and an output current of the solar cell outputting to the load 403. Regarding to the equivalent circuit in conjunction with the characteristics of the P-N semiconductors, an equivalent mathematical formula is illustrated below:

$$I=I_{ph}-I_{sat}[e^{q(V+IRs)/AkT}-1]-(V+IR_s)/R_{sh}$$

Wherein $I_{sat}$ is the reverse saturation current of the solar cell, q is a charge amount of an electron ($1.6\times10^{-19}$ coulomb), A is an ideal factor of the solar cell (A=1~5), k is the Boltzmann constant ($1.3\ 8\times10^{-23}$ J/K), and T is a temperature of the solar cell (absolute temperature K).

By analyzing the above formula, some basic characteristics of the solar cell are identified, e.g., the photovoltaic current is zero when the solar cell is not exposed under the sunlight. At the moment, the solar cell is just like normal diodes. When the solar cell circuit is short, the voltage is zero and the short circuit current is almost equal to the photovoltaic current.

(2) The Wind Power Generation System 205:

As per the wind power generation system, a wind turbine is a rotary device that converts the wind power into a useful form of energy. First, the blade rotating speed ratio λ of the wind turbine blade is designed below:

$$\lambda=r\omega_m/v$$

Wherein r is a radius of the wind turbine blade, $\omega_m$ is a rotating speed of the wind turbine, and v is the wind speed. In addition, the power coefficient of wind energy generation is a function of the blade rotating speed ratio $C_p=f_g(\lambda)$. Moreover, the wind turbines with different sizes of blades have different corresponding relationship of the power coefficients with respect to the blade rotating speed ratio. The mechanical power $P_m$(W) produced from the wind turbine is positive proportional to an air density $\rho$(kg/$m^3$), a blade rotation area A($m^2$), the power coefficient $C_p$, and a cube of the wind speed v. The mechanical power is represented as following:

$$P_m=0.5\rho AC_pv^3$$

Figure 3B:
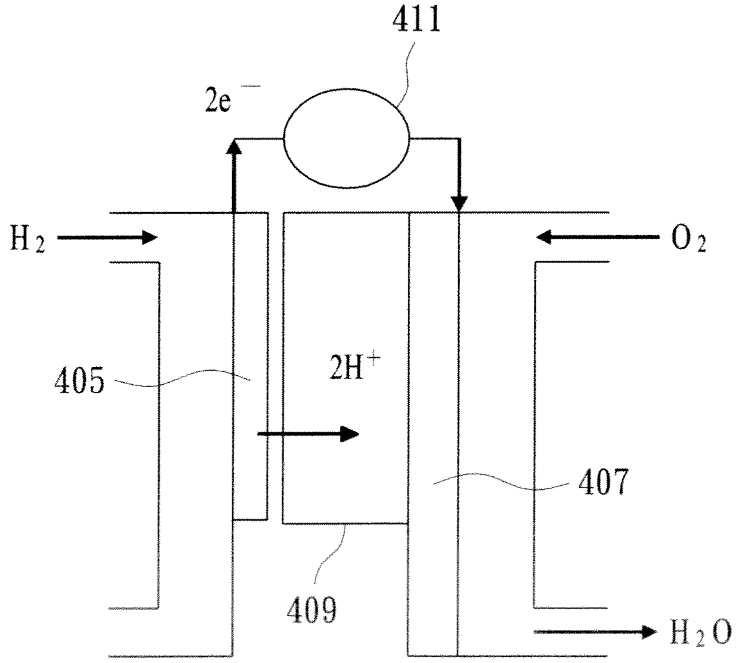
FIG. 3B demonstrates a functional schematic diagram of a fuel call generation system in accordance with the present invention.

(3) The Fuel Cell Power Generation System 207:

A fuel cell is an electrochemical cell that converts a source fuel into an electrical power. The principle of power generating could be interpreted as the reverse reaction of water electrolysis. The schematic diagram of the fuel cell power generation system is shown in FIG. 3B. The fuel cell power generation systems comprises an anode 405, a cathode 407 (electrode), electrolyte member 409, and a power collector 411. The anode 405 and the cathode 407 have the relationship formula as following:

$$\text{Anode}: H_2\rightarrow 2H^++2e^-$$

$$\text{Cathode}: \tfrac{1}{2}O_2+2H^++2e^-\rightarrow H_2O$$

The output voltage formula of the fuel cell:

$$V_{FC}=E_{Nernst}-V_{act}-V_{ohmic}-V_{con}$$

Wherein $E_{Nernst}$ represents a reversible voltage of the fuel cell, $V_{act}$ represents the loss of potential that is used to overcome the activation energy, $V_{ohmic}$ represents the loss potential for ohmic polarization of the fuel cell, and $V_{con}$ represents the loss potential caused by concentration polarization. The output power of the fuel cell is represented as following:

$$P_s=n^*V_{FC}i_{FC}$$

Wherein n represents the number of the fuel cells, $V_{FC}$ represent the output voltage of the fuel cell, and $i_{FC}$ represents the output current of the fuel cell.

After building up the aforementioned mathematical modules for each of different power sources, and as it is required to estimate the installation capacity ratio of the hybrid power per each installation side, the mathematical modules for each power source incorporated with environmental factors, whether information may be applied to find out the capacity coefficients. The technical proposal for configuring the installation capacity of the hybrid power systems incorporated with the capacity coefficients may get the golden ratio of the installation capacities associated with the hybrid energy generation system 20 installed on the particular installation site.

Again refer to FIG. 2. The hybrid energy generation system 20 comprises a power conversion system 201, an electrolysis system 209, an oxygen storage system 211, and a hydrogen storage system 213. The power conversion system 201, coupled to the solar power generation system 203, the wind power generation system 205, and the fuel cell power generation system 207, for receiving the electricity generated from the power systems, rectifying, filtering, transforming, and distributing the electricity to a load or sell it for profit.

The electrolysis system 209, coupled to the solar power generation system 203 and the wind power generation system 205, may utilize excess power generated from the solar power generation system 203 and the wind power generation system 205 to process water electrolysis for generating oxygen and hydrogen. The oxygen and hydrogen might be respectively transferred to the oxygen storage system 211 and the hydrogen storage system 213. The oxygen and hydrogen stored in the storage systems 211, 213 might be for sale or supply to the fuel cell power generation system 207 to generate the power under an emergency situation. In other words, hydrogen is a primary fuel of the fuel cell power generation system 207, while oxygen is a combustion gas for supporting the reaction. Hence, the fuel cell power generation system 207 plus the hydrogen storage system 213 may be considered as a power storage system for reserving excess power. The power systems in the hybrid energy generation system 20 includes not only power generation devices but also storage power systems, such as the aforementioned fuel cell power generation system 207 plus the hydrogen storage system 213, or rechargeable batteries.

Due to the environmental awareness and the carbon dioxide pollution problem caused by the greenhouse effect, the world is actively promoting and developing renewable energy. Each of different renewable power generation systems is gradually matured. Thus, according to the present invention, the hybrid energy generation system 20 may not only utilize the aforementioned matured and developed techniques, e.g., the solar power generation system, the wind power generation system, and the fuel cell power generation system, but also flexibly coordinate a tidal power, a hydropower, a geothermal power, and a biomass power into the hybrid energy generation system 20. Instead of the renewable energy, the hybrid energy generation system 20 of the present invention may incorporate with other traditional energy sources, e.g., a diesel engine power and a thermal power according to the requirements with respect to different installation sites. The configuration of the hybrid energy generation system 20 is not limited to any specific energy sources. The determination of most suitable combinations of power systems for the hybrid energy generation system 20 is depending on the actual requirements in accordance with different installation sites.

Figure 4:
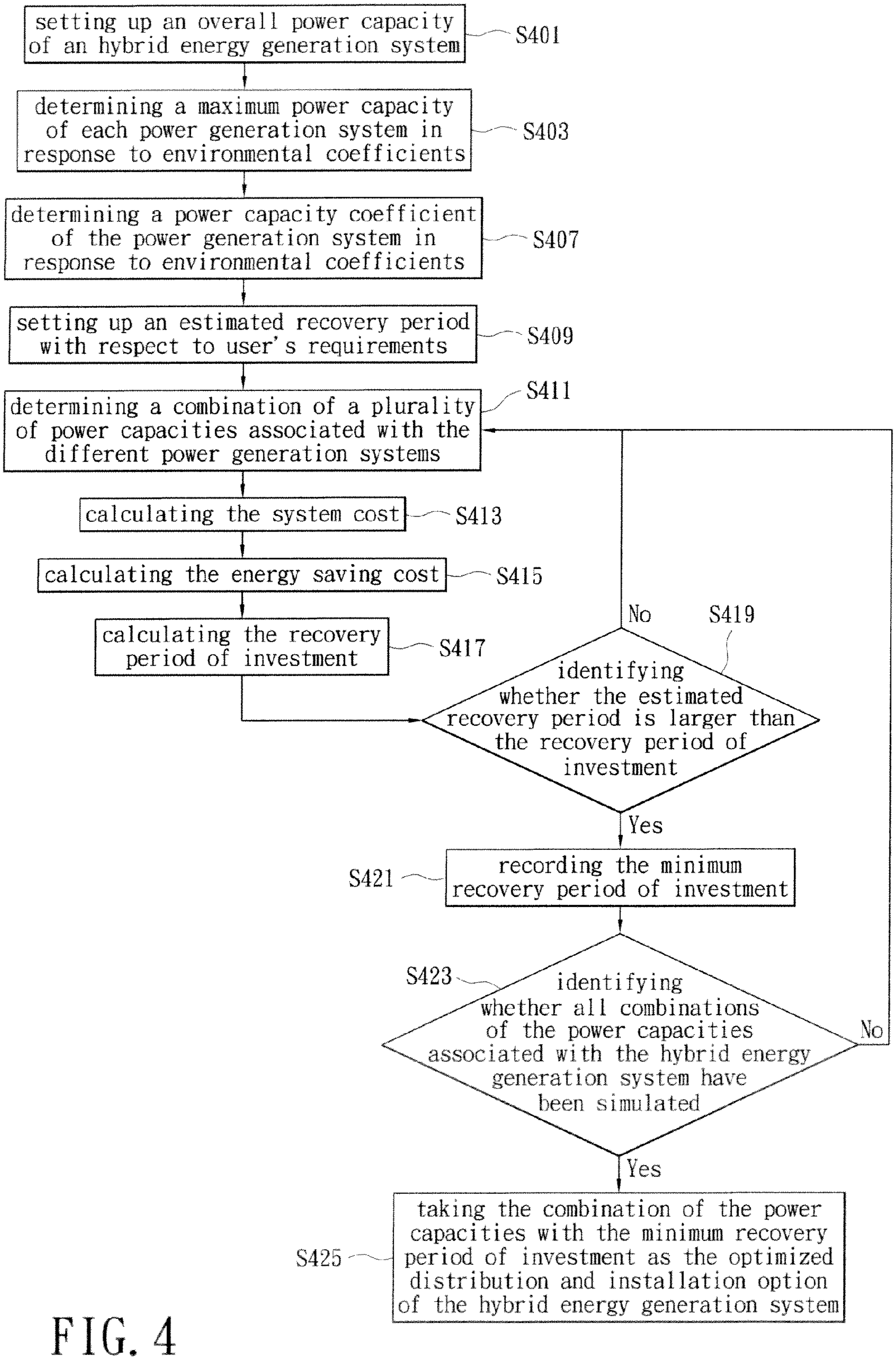
FIG. 4 demonstrates a flowchart diagram of an embodiment associated with a method for configuring installation capacities of a hybrid energy generation system in accordance with the present invention.

Then please refer to FIG. 4, in which a flowchart diagram of an embodiment associated with a method for configuring installation capacities of a hybrid energy generation system 20 in accordance with the present invention is demonstrated. The method includes: setting up a total power requirement of a hybrid energy generation system 20 according to a user's requirements in step S401. In the embodiment, the total power requirement of the hybrid energy generation system 20 may be a history electricity usage information of the installation site which includes a contract capacity and an over-contract capacity $P_{2p}$ and $P_{3p}$. The total power requirement is equivalent to the summation of the over-contract capacity $P_{2p}$ plus the over-contract capacity $P_{3p}$. Herein, $P_{2p}$ and $P_{3p}$ respectively represent a power consumption amount within 110% of contract power and a power consumption amount over 110% of contract power. While a normal user who consume power amount over the contract power, the power company will charge additional fee from the user. Therefore, to reduce an electricity bill, this is a major issue needed to be solved. In the embodiment, the total power requirement takes the over-contract capacity as a standard point for example, but not limited thereto depending on the user's needs.

Moreover, the step further includes: determining a maximum installation capacity of each power generation system in response to at least one environmental parameter in step S403. In the embodiment, the power systems may be the solar power generation system 203, the wind power generation system 205, and the fuel cell power generation system 207. The required environmental parameters may be commanding height of an installation site, an installation area $A_s$ for the configuration of the solar panel without shelter, or a wind farm area $A_w$ for installing a wind turbine, so as to calculate a maximum installation capacity which is most appropriate at the installation site. According to different power systems, the environmental parameters which are required to be taken into consideration may be varied.

In the embodiment, because the fuel cell power generation system 207 functions individually and is not affected by climate or external factors with expensive production cost, the fuel cell power generation system 207 is designed to be an emergency backup power system and the emergency backup installation capacity $cap_f$ setups to be the power capacity of the fuel cell power generation system 207. It is worth to mention that even though the setup topology for the installation capacity $cap_f$ of the fuel cell power generation system 207 according to the present invention depends on the emergency backup power amount, the fuel cell power generation system 207 may still supply power under a normal mode not be necessary to supply power under an emergency situation.

Then, the step S407 of determining a capacity coefficient of the power generation system in response to environmental parameters is performed. The capacity coefficient is the ratio of the actual power generation with respect to the ideal power generation in accordance with the corresponding power systems. In the embodiment, the environmental parameter which is used to calculate the capacity coefficient may be a local temperature, wind speed, or an illumination of an installation site. The attained capacity coefficient may be the capacity coefficient $fac_s$ of the solar power generation system 203 or the capacity coefficient $fac_w$, of the wind power generation system 205. With respect to different power systems, the required environmental parameters would be taken into account varies, e.g., the hydropower generation system needs to consider a water flow amount and a water flow rate, the geothermal generation system needs to consider a amount of heat carriers (water and steam) and a geothermal temperature, and the biomass power generation system is required to consider a amount of biomass (such as organic matter produced from wood, animal dead bodies, or other biological products).

Additionally, in step S409, an expected recovery period with respect to user's requirements is setup. In step S411, a combination of a plurality of installation capacities $cap_s$ and $Cap_w$ associated with the different power generation systems is determined according to the total power requirement, the maximum installation capacities, the capacity coefficient $fac_s$ and the capacity coefficient $fac_w$. Therein, the installation capacity cap is the configured installation capacity of the solar power generation system 203 in the hybrid energy generation system 20, while the installation capacity $cap_w$ is the configured installation capacity of the wind power generation system 205 in the hybrid energy generation system 20. The relationship formula regarding to the load terminal and the capacity coefficients are shown below:

$$P_{total}=fac_s*cap_s+fac_w*cap_w+fac_f*cap_f$$

Wherein subscripts f、s、w represent the fuel cell, the solar power, and wind power accordingly, while fac and cap represent the capacity coefficient and the installation capacity respectively.

Subsequently, according to the aforementioned installation capacity combinations, the installation capacity configuration system 10 may calculate a system cost Cost associated with the hybrid energy generation system 20 in step S413 and calculate an energy saving cost $M_r$ reduced caused by the application of the hybrid energy generation system 20 in step S415.

In the embodiment, the calculation of the system cost Cost of the hybrid energy generation system 20 may include an installation cost $I_k$, a maintenance fee $OM_{Pk}$, and a remaining value $S_{Pk}$, wherein k means every one of the power systems; in other words, s is for solar power, w for wind power, and f for fuel cell power in the embodiment. The aforementioned embodiment is taken for illustration, but not limited thereto. The formula is demonstrated below:

$$\mathrm{Cost}=\Sigma_{k=s,w,f}(I_k-S_{P_k}+OM_{P_k})$$

1. Installation cost $I_k$:

$$I_s=\mathrm{cost}_s*cap_s$$

$$I_w=\mathrm{cost}_w*cap_w$$

$$I_f=\mathrm{cost}_f*cap_f$$

Wherein $cost_w$, $cost_s$, and $cost_f$ represent the installation costs for the wind power generation system 205, the solar power generation system 203, and the fuel cell power generation system 207 per a thousand watt, accordingly. Further, $cap_w$, $cap_s$, and $cap_f$ represent the installation capacities for the wind power generation system 205, the solar power generation system 203, and the fuel cell power generation system 207, respectively.

2. Remaining Value $S_{Pk}$:

With the development of the hybrid energy generation system 20, the system value decreases over years. Therefore, it is necessary to consider the value variation while the service life extends. The remaining value formula of the hybrid energy generation system 20 is represented as following:

$$S_{P_w}=0.1*cost_w*cap_w*\left(\frac{1+\beta}{1+\gamma}\right)^{N_p}$$

$$S_{P_s}=0.1*cost_s*cap_s*\left(\frac{1+\beta}{1+\gamma}\right)^{N_p}$$

-continued $$S_{P_f}=0.1*cost_f*cap_f*\left(\frac{1+\beta}{1+\gamma}\right)^{N_p}$$

Wherein, $S_{Pw}$, $S_{Ps}$, and $S_{Pf}$ represent the remaining values of the wind power generation system 205, the solar power generation system 203, and the fuel cell power generation system 207. The recovery value is almost 1/10 of the installation cost, β represents an inflation rate, γ represents a bank interest rate, and $N_p$ is a system service life.

3. Maintenance Fee $OM_{Pk}$:

With the development and operation of the hybrid energy generation system 20, the maintenance fee is required every year for ensuring the system to operate normally. The maintenance fee is demonstrated below:

$$OM_{P_s}=0.01*cost_s*cap_s*\sum_{j=1}^{N_p}\left(\frac{1+v}{1+\gamma}\right)^j$$

$$OM_{P_w}=0.05*cost_w*cap_w*\sum_{j=1}^{N_p}\left(\frac{1+v}{1+\gamma}\right)^j$$

Wherein $OM_{Pw}$ and $OM_{Ps}$ represents the maintenance fees of the wind power generation system 205 and the solar power generation system 203. The maintenance fee every year is respectively around 5% and 1% of the installation costs. The fuel cell can be used within a specific time, e.g., 4,000 hours. The fuel cell is replaced once the time has reached the limit time line. Therefore, it has no maintenance fee. Furthermore, v represents the growing rate of the maintenance fee, γ represents a bank interest rate, and is a system service life.

In view of the energy saving cost $M_r$, as per the aforementioned embodiment, it may contain a fine of exceeding contract power $M_p$, a basic power fee $M_b$, a flow power fee $M_f$, and a fee of carbon dioxide reduction $M_{CO2}$.

1. To prevent the fine of exceeding contract power $M_p$ $$M_{2p}=(sm_{cap\_cost}*sm_{mon}+wt_{cap_{cost}}*wt_{mon})*2*P_{2p}$$

$$M_{3p}=(sm_{cap\_cost}*sm_{mon}+wt_{cap_{cost}}*wt_{mon})*3*P_{3p}$$

$$M_p=M_{2p}+M_{3p}$$

Wherein, $M_{2p}$ is two times of the penalty fine, $M_{3p}$ is three times of the penalty fine, $P_{2p}$ represents a power consumption amount within 110% of the base power line, $P_{3p}$ represents a power consumption amount over 110% of the contract power, $sm_{mon}$ represents a number of summer months, $wt_{mon}$ represents a number of winter months, $sm_{cap\_cost}$ represents a power cost every thousand watt during summer months, and $wt_{cap\_cost}$ represents a power cost every thousand watt during winter months.

2. To save the basic power fee $M_b$ $$M_b=(sm_{cap\_cost}*sm_{mon}+wt_{cap_{cost}}*wt_{mon})*(P_w+P_s)$$

Wherein, $P_w$ and $P_s$ represent the actual power rate (the installation capacity times the capacity coefficient) of the wind power generation system 205 and the solar power generation system 203 respectively. And $sm_{mon}$ represents a number of summer months, $wt_{mon}$ represents a number of winter months, $sm_{cap\_cost}$ represents a power cost every thousand watt during summer months, and $wt_{cap\_cost}$ represents a power cost every thousand watt during winter months. Because the fuel cell has expensive production cost and shorter service life, it has been primarily applied in the emergency situations for supplying power. In the embodiment for calculating the basic power fee, the fuel cell is not taken into account.

3. To save the flow power fee $M_f$ $$M_f=(P_w+P_s)*h*d*eg_{cost}$$

Wherein, $P_w$ and $P_s$ represent the actual power rate (the installation capacity times the capacity coefficient) of the wind power generation system 205 and the solar power generation system 203 respectively, h and d represents 24 hours per day and 365 days per year, respectively, $eg_{cost}$ represents an average price per one Kilowatt Hour (KWH). Again, because the fuel cell has expensive production cost and shorter service life, it has been primarily applied in the emergency situations for supplying power. In the embodiment for calculating the flow power fee, the fuel cell is not taken into account.

4. A fee of carbon dioxide reduction $M_{CO2}$.

$$M_{CO_2}=(P_w+P_s)*wg_{CO_2}*\text{cost}_{CO_2}*h*d$$

Wherein, $P_w$ and $P_s$ represent the actual power rate (the installation capacity times the capacity coefficient) of the wind power generation system 205 and the solar power generation system 203 respectively, h and d represents 24 hours per day and 365 days per year, respectively, $\text{cost}_{CO2}$ represents a reduction cost for reducing carbon dioxide $CO_2$ per ton, and $wg_{CO2}$ represents the amount of carbon dioxide $CO_2$ produced per 1 KWH. Therefore, because the fuel cell has expensive production cost and shorter service life, the fuel cell is not taken into account to calculate the fee of carbon dioxide $CO_2$ reduction in the embodiment.

As per the aforementioned conditions, the energy saving cost $M_r$ every year is shown:

$$M_r=M_p+M_b+M_f+M_{CO_2}$$

Again refer to FIG. 4, the step S417 further includes: according to the system cost and the energy saving cost, the installation capacity configuration system 10 can calculate the recovery period. The installation capacity configuration system 10 identifies whether the expected recovery period is larger than the recovery period in step S419. If the result is no, go back to step S411 to determine another combination of the installation capacities; if the result is yes, the installation capacity configuration system 10 records the minimum recovery period in step S421, then determine whether all combinations of the installation capacities associated with the hybrid energy generation system has been simulated in step S423; as the result is no, go back to step S411 to determine another combination of the installation capacities; if the result is yes, the combination of the installation capacities with the minimum recovery period is taken as the optimized distribution and installation option of the hybrid energy generation system in step S425.

While considering the service life of the hybrid energy generation system 20 (a normal solar panel and a wind turbine have service life around 20 years), as long as the system cost Cost deducted the energy saving cost $M_r$ could not become a negative value within the service life or the expected recovery period, the system cost Cost cannot get back.

Figure 5:
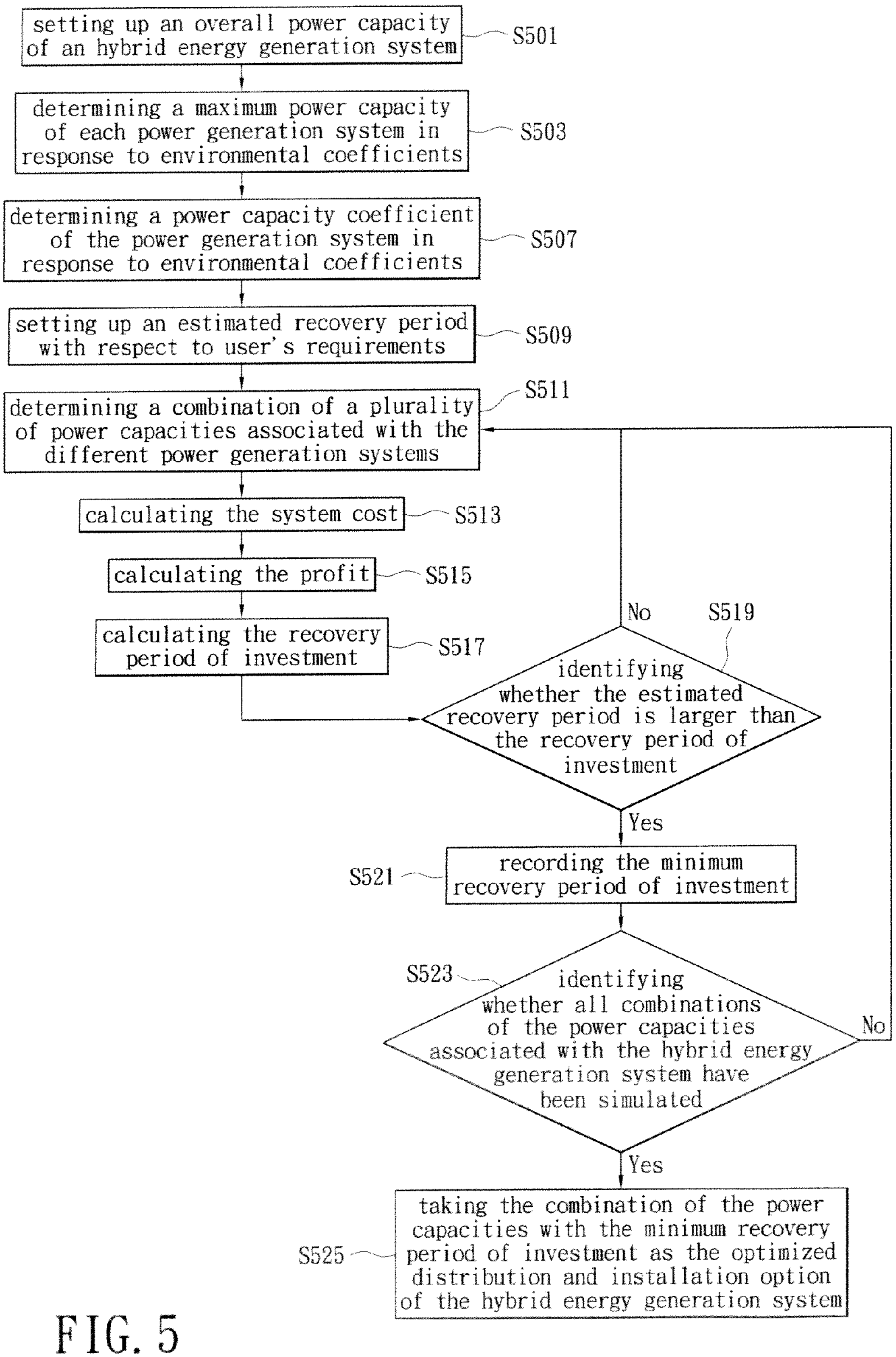
FIG. 5 demonstrates a flowchart diagram of another embodiment associated with a method for configuring installation capacities of a hybrid energy generation system in accordance with the present invention.

Please refer to FIG. 5, in which a flowchart diagram of another embodiment associated with a method for configuring installation capacities of a hybrid energy generation system 20 in accordance with the present invention is demonstrated. The steps comprise: setting up a total power requirement of an hybrid energy generation system in step S501; determining a maximum installation capacity of each power generation system in response to environmental parameters in step S503; determining a capacity coefficient of the power generation system in response to environmental parameters in step S507; and setting up an expected recovery period with respect to user's requirements in step S509.

Then the installation capacity configuration system 10 determines a combination of a plurality of installation capacities associated with the different power generation systems in step S511; it calculates the system cost in step S513; it calculates the profit in step in step S515; it calculates the recovery period in step S517; it identifies whether the expected recovery period is larger than the recovery period in step S519; it records the minimum recovery period in step S521; it identifies whether all combinations of the installation capacities associated with the hybrid energy generation system has been simulated in step S523; and it takes the combination of the installation capacities with the minimum recovery period as the optimized distribution and installation option of the hybrid energy generation system in step S525.

The only different between FIG. 4 and FIG. 5 is that the user sells the power generated from the hybrid energy generation system 20 for profit. For example, the power company is encouraged to buy renewable power. With regard to conditions for the power company to purchase the recovery power incorporated with the hybrid energy generation system, the recovery cost is observed as following:

$$R_s=P_s*b_s*h*d$$

$$R_w=P_w*b_w*h*d$$

Wherein, $P_w$ and $P_s$ respectively represent the actual power rate (the installation capacity times the capacity coefficient) of the wind power generation system 205 and the solar power generation system 203, $R_s$ and $R_w$ respectively represent the overall selling amount for the power generated from the solar power generation system 203 and the wind power generation system 205 every year, and $b_s$ and $b_w$ respectively represent the buying price of the power company per one KWH generated from the solar power generation system 203 and the wind power generation system 205. Since there are no purchasing policies promoted by governments, the fuel cell will not be discussed here. Hence, As the system cost Cost deduceted, $R_s$ and $R_w$, the overall selling amount for the power generated from the solar power generation system 203 and the wind power generation system 205, respectively, becomes a negative value which means the system cost is earned back. Once the system cost is earned back within the expected recovery period, record the minimum recovery period $N_{min}$ recently. After processing all combinations of the hybrid power systems, the installation capacity ratio with respect to the minimum recovery period $N_{min}$ of the hybrid energy generation system 20 is the golden ratio of hybrid installation capacities at the installation site.

Figures 1, 6:
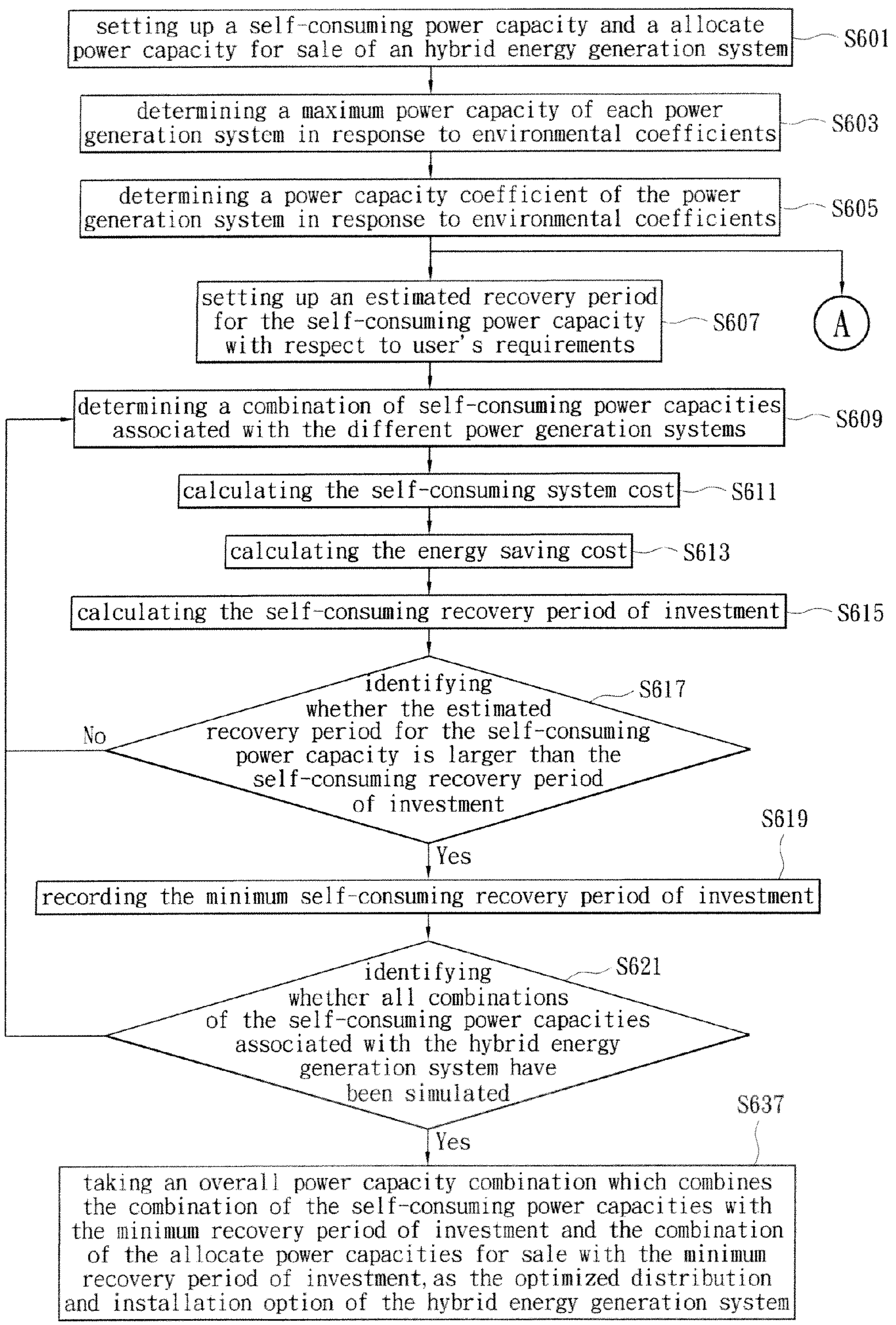
Figures 2, 6:
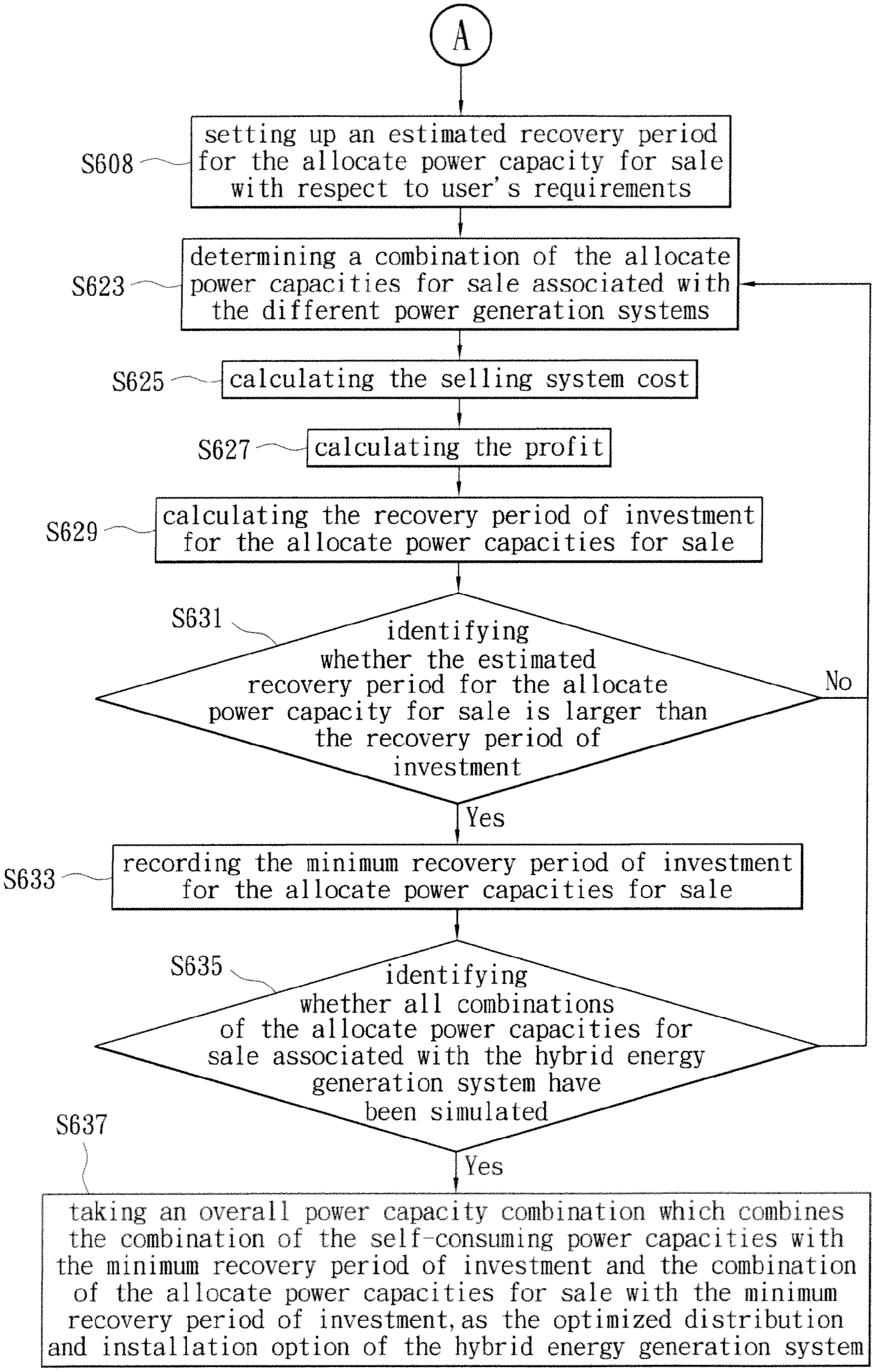

It is also true that the power generated from the hybrid energy generation system 20 may be partially consumed and partially on sale as shown in FIGS. 6-1 and 6-2. The steps include: setting up a self-consuming installation capacity and a selling installation capacity of an hybrid energy generation system according to a user's demand in step S601. Therefore, the installation capacity could be configured as two parts which are a self-consuming installation capacity and a selling installation capacity and the amount of each capacities could be altered each other with respect to a user's requirement; then determining a maximum installation capacity of each power generation system in response to environmental parameters in step S603; and determining a capacity coefficient of the power generation system in response to environmental parameters in step S605.

Because the power is defined into two categories in the embodiment, the process regarding to the two categories are separately calculated in the embodiment. The process associated with self-consuming power has steps comprising: setting up an expected self-consuming recovery period with respect to the user's requirements in step S607; processing a combination of the self-consuming installation capacities according to the self-consuming installation capacity, the maximum installation capacities, and the capacity coefficients in step S609; then calculating a self-consuming system cost according to the combination of the self-consuming installation capacities in step S611; calculating an energy saving cost of a load which utilizes partial power generated from the hybrid energy generation system in step S613; and dealing with a self-consuming recovery period according to the self-consuming system cost and the energy saving cost in step S615, wherein the self-consuming recovery period represents the time which is canceled by the system cost and the energy saving cost.

Next, the steps further include: determining whether an expected self-consuming recovery period is larger than the self-consuming recovery period, as the expected self-consuming recovery period is smaller than or equals to the self-consuming recovery period in step S617, go back to step S609. As the expected self-consuming recovery period is larger than the self-consuming recovery period, the system records the minimum self-consuming recovery period in step S619. Moreover, the system identifies whether all combinations of the self-consuming installation capacities have been simulated in step S621. As the identified result demonstrates that there are combinations which have not been processed, go back to step S609.

On the other hand, the process associated with excess power for sale has steps, comprising: setting up an expected recovery period for the selling installation capacity with respect to the user's requirements in step S608; processing a combination of the selling installation capacities according to the selling installation capacity, the maximum installation capacities, and the capacity coefficients in step S623; then calculating a selling system cost according to the combination of the selling installation capacities in step S625; calculating a selling profit achieved from selling partial power generated from the hybrid energy generation system to a buyer in step S627; and dealing with a selling recovery period according to the selling system cost and the profit in step S629, wherein the selling recovery period represents the time which is the selling system cost is equal to the profit.

Next, the system identifies whether an expected recovery period for the selling installation capacity is larger than the selling recovery period. As the expected recovery period for the selling installation capacity is smaller than or equals to the recovery period in step S631, go back to step S623. As the expected recovery period for the selling installation capacity is larger than the recovery period, the system record the minimum selling recovery period in step S633. Then, the system further identifies whether all combinations of the selling installation capacity associated with the hybrid energy generation system have been calculated in step S635. While the identified result demonstrates that there are combinations which have not been processed, go back to step S623.

Finally, the overall installation capacity combination includes the combination of the self-consuming installation capacities with the minimum recovery period and the combination of the selling installation capacities with the minimum recovery period, as the optimized configuration option of the hybrid energy generation system.

Moreover, the aforementioned hybrid energy generation system 20 may include an emergency backup power system, in which the installation capacity of the emergency backup power system is determined according to an amount of emergency power consumption with respect to the installation site conditions, so that the emergency backup power system could work under an emergency situation. The emergency backup power system may be the fuel cell power generation system 207 or any other kinds of power systems.

Herein, an embodiment is illustrated. The main objective of the hybrid energy generation system 20 is how to utilize the emergency backup power system efficiently so as to avoid a fine of consuming power over 110% contract power. For example, a school is chosen to be the installation site. According to information of the electricity monitoring system functioning in the school, in 2009, the overall power consumption over 110% of contract power for the school is around 176 KW, i.e., the total power requirement must reach 176 KW.

All important database of the school are stored in a information service center. Therefore, the information service center has to work normally without any interrupts of power shortage from the power system of the power company. The fuel cell in the hybrid energy generation system 20 only supplies electricity under the emergency situation, since the fuel call is expensive. Therefore, the power provided by the fuel cell is supposed to fully support the total power requirement of the information service center. In 2009, according to the information of the electricity monitoring system of the school, it has to provide around 72 KW power as the emergency power. Hence, while the power capacity of the fuel cell is 72 KW, the solar power and the wind power must provide 176−72=104 (KW) power to prevent paying the fine of consuming power over 110% of contract power.

Taking the actual installation area of the school for configuring the solar cell and wind power generation system into consideration, it is easy to notify that the roof of the school can install the solar power generation system providing power around 210 kW and the wind power generation system providing electricity around 250 kW. According to the pre-simulation and the research result in the area of the school, the power capacity coefficients $fac_s$ and $fac_w$ are respectively 10.7% and 34.33% for the solar power generation system and the wind power generation system. Then, by applying the aforementioned technique of optimizing installation capacity of the hybrid energy generation system 20, the golden ratio of the installation capacities with respect to the hybrid energy generation system 20 installed in the school can be attained. The environmental parameters of the school which are applied for analysis is shown in table 1 below.

| Title | Value |
|---|---|
| Power required at the load side | 176 KW |
| Installation cost of solar power system per thousand watt | $150,000 |
| Installation cost of wind power generation system per thousand watt | $ 50,000 |
| Installation cost of fuel cell power generation system per thousand watt | $280,000 |
| Service life of solar panel | 20 years |
| Service life of wind turbine | 20 years |
| Service life of fuel cell | 4,000 hours |
| Inflation rate | 2.4% |
| Bank interest rate | 1.568% |

-continued

| Title | Value |
|---|---|
| Buying price for every one KWH generated from solar power generation system | $ 12.97 |
| Buying price for every one KWH generated from wind power generation system | $ 2.38 |
| Reduction cost for reducing carbon dioxide per ton | $650 |
| Amount of carbon dioxide generated per one KWH | 0.636 KG |
| Number of summer months | 4 |
| Number of winter months | 8 |
| Power cost per thousand watt in summer months | $213 |
| Power cost per thousand watt in winter months | $169 |
| Average power cost per KWH | $ 3 |

Through the technique for configuring the installation capacities of the hybrid energy generation system 20, the recovery period for the hybrid energy generation system 20 installed in the school is organized and demonstrated in table 2 below. The information demonstrates that the self-consuming recovery period is 14 years, while the recovery period incorporated with the power company to sell the excess power for profit is around 17 years. The main reason regarding to the difference is that the school has a higher wind power generation efficiency, while the buying price for electricity generated from the wind power system is low.

| Type and amount of hybrid power system | Self-consuming recovery period | Power selling recovery period |
|---|---|---|
| Solar power + wind power + fuel cell: 169.86 * 0.107 + 250 * 0.3433 + 72 * 1 = 176 | 14 | 17 |

The method for installation capacities of the hybrid energy generation system 20, is suitable for determining the golden ratio of installation capacity configuration associated with the hybrid energy generation system 20 at different installation sites. The present invention does not only propose to estimate the actual installation site area for configuring the hybrid energy generation system 20, but also provide a concept of capacity coefficients, so that the appropriate amount of the installation capacities and actual power generation efficiency with respect to the local installation sites are well known. Through taking the installation cost and recovery cost of the hybrid energy generation system 20 into consideration, it is beneficial to find out the most cost-efficient installation capacity ratio. Furthermore, it may adjust the installation capacity ratio in accordance with the environmental simulations setup by users, thereby promoting the actual value and efficiency of use for the hybrid energy generation system.

The descriptions illustrated supra set forth simply the preferred embodiments of the present invention; however, the characteristics of the present invention are by no means restricted thereto. All changes, alternations, or modifications conveniently considered by those skilled in the art are deemed to be encompassed within the scope of the present invention delineated by the following claims.

What is claimed is:

1. A method for configuring installation capacities of a hybrid energy generation system which includes a plurality of power systems, for generating at least one combination of installation capacities which is respectively associated with the power systems, comprising:

(a) an installation capacity configuration system, including a processing unit, an input unit and an environment detecting unit, the installation capacity configuration system being introduced to configuring the installation capacities associated with the power systems in the hybrid energy generation system, wherein the processing unit calculates a plurality of capacity coefficients and a plurality of maximum installation capacities respectively corresponding to the power systems according to at least one environmental parameter detected by the environment detecting unit, wherein the capacity coefficient is a ratio of an actual generated power to an ideal generated power of ta corresponding power system (b) the processing unit of the installation capacity configuration system evaluating the combination of installation capacities according to a total power requirement, the maximum installation capacities, and the capacity coefficients, wherein the total power requirement is a contract capacity, an over-contract capacity, or a value which is set according to a user's requirements (c) the processing unit of the installation capacity configuration system calculating a system cost of the hybrid energy generation system;

(d) the processing unit of the installation capacity configuration system calculating a recovery cost due to using the power generated by the hybrid energy generation system;

(e) the processing unit of the installation capacity configuration system calculating a recovery period according to the system cost and the recovery cost, wherein the recovery period represents the time when the system cost is equal to the recovery, cost; and determining whether an expected recovery period according to the user's requirement is larger than the recovery period or not, if the expected recovery period is smaller than or equals to the recovery period, go back to step (b); and (f) the installing capacity configuration system determining whether all combinations of the installation capacities are evaluated or not, when if there is the combination which is not evaluated, the method then goes back to step (b) by the processing unit of the installation capacity configuration system evaluating the combination which is not evaluated, when all combinations are evaluated already, the combination of installation capacities with minimum recovery period is deemed as the optimized configuration of the hybrid energy generation system.

2. The method for configuring installation capacities of the hybrid energy generation system according to claim 1, further including calculating the system cost to calculate an installation cost, a maintenance fee, and a remaining value according to the following formulas:

$$\text{Cost} = \sum (Ii - Spi + OMpi)$$

wherein, Cost is the system cost, M is the total number of the power systems, Ii is the installation cost of the corresponding power system, remaining value of the corresponding power system, and OMpi is the maintenance fee of the corresponding power system;

the formula of the installation cost is:

$$Ii=\text{cost}i*\text{cap } vi=I\sim M$$

wherein, costi is the installation cost per thousand watt of the corresponding power system, and capi is the installation capacity of the corresponding power system;

the formula of the remaining value is:

$$Spi=k*\text{cost}i*\text{cap}i*(1+B/1+y)^{NP}$$

wherein, k is a ratio of recovery value to equipment cost, B represents an inflation rate, y represents a bank interest rate, and Np is a system service life; and the formula of the maintenance fee is:

$$OMPi = q*costi*caPi*^{Np}\sum_{j=1}(1+v/1+7)^J$$

wherein, q is the ratio of maintenance fee to equipment cost each year, and v represents the growing rate of the maintenance fee.

3. The method for configuring installation capacities of the hybrid energy generation system according to claim 1, wherein the power systems could be at least two which are selected among a solar power generation system, a wind power generation system, a hydropower generation system, a geothermal power generation system, a biomass power system, a fuel cell power generation system, and an energy storage system.

4. The method for configuring installation capacities of the hybrid energy generation system according to claim 1, wherein the environmental parameter is a temperature, an illumination, a wind speed, a water flow, a water flow rate, a quantity of heat carrier, a geothermal temperature, a biomass volume, or an installation area of the power system.

5. The method for configuring installation capacities of the hybrid energy generation system according to claim 1, wherein the power system is an emergency backup power system, in which the installation capacity of the emergency backup power system is determined according to an amount of emergency power consumption of the installation site conditions.

6. The method for configuring installation capacities of the hybrid energy generation system according to claim 1, wherein the recovery cost is energy saving cost or a selling profit; the energy saving cost represents a cost reduction cause by applying the power generated by the hybrid energy generation system to a load, and the selling profit represents a profit which is received due to selling the generated power of the hybrid energy generation system to a buyer.

7. The method for configuring installation capacities of the hybrid energy generation system according to claim 6, wherein the energy saving cost is a fine of exceeding contract power, a basic power fee, a flow power fee, or a fee of carbon dioxide reduction, the formula of the fine of exceeding contract power Mp is:

$$M2p=(sm_{cap\_cost}*sm_{mon}+wt_{capcost}*wt_{mon})*2*P2p$$

$$M3p-(sm_{cap\_cost}*sm_{mon}+wt_{capcost}*wt_{mon})*3*P2p$$

$$Mp=M2p+M3p$$

wherein, M2p is two-times penalty, M3p is three-times penalty, P2p represents an exceeding power consumption amount within 10% of contract power, P3p represents an exceeding power consumption amount over 10% of contract power, $Sm_{mon}$ represents a number of summer months, $Wt_{mon}$ represents a number of winter months, $Sm_{Cap\ cost}$ represents a power cost per thousand watt summer months, and $Wt_{cap\ cost}$ represents a power cost per thousand watt during winter months;

the formula of the basic power fee Mb is:

$$Mb=(sm_{cap\ oost}*Sm_{mon}+Wt_{cap\_cost}*Wt_{mon})*(\Sigma_{i=1=M}Pi)$$

wherein, Pi represents the actual power of the corresponding power systems, and M is the total number of the power systems;

the formula of the flow power fee Mf is:

$$M_f=\left(\sum_{i=1=M}Pi\right)*h*d*eg_{cost}$$

wherein, h represents a number of hours per day, d represents a number of days per year, $eg_{cost}$ represents an average price per one KWH; and the formula of the fee of carbon dioxide reduction is:

$$M_{co2}=\left(\sum_{i=1}^{M}Pi\right)*WGco2*Costco2*h*d$$

wherein, costco2 represents a reduction cost for reducing carbon dioxide per ton, and wgco2 represents the amount of produced carbon dioxide per one KWH;

wherein, the buyer is a power company and the formula of selling profit is:

$$Ri=Pi*bi*h*d, i=1\sim M$$

wherein Ri is the selling profit of the corresponding power system, bi is the buying cost per KWH generated by the power system.

8. A method for configuring installation capacities of a hybrid energy generation system which includes a plurality of power systems, for generating at least one overall combination of installation capacities which respectively associated with the plurality of power systems, comprising:

(a) an installation capacity configuration system, including a processing unit, an input unit and an environment detecting unit, introduced to configure the installation capacities associated with the power systems in the hybrid energy generation system, where in the processing unit calculates a plurality of capacity coefficients and a plurality of maximum installation capacities: respectively corresponding to the power systems according to at least one environmental parameter, which is detected by the environment detecting unit, wherein the capacity coefficient is ratio of actual generated power to the ideal generated power of the corresponding power systems;

(b) setting up a self-consuming installation capacity and a selling installation capacity according to user's requirements, wherein the self-consuming installation capacity is the amount of power which is self-used, and the selling installation capacity is the amount of power which is sold to others;

(c-1) evaluating a combination of self-consuming installation capacities according to the self-consuming installation capacity, the maximum installation capacities, and the capacity coefficients;

(d-1) the installation capacity configuration system calculating a self-consuming system cost according to the combination of self-consuming installation capacities;

(e-1) the installation capacity configuration system calculating an energy saving cost caused by applying part of the power generated by the hybrid energy generation system to a load according to the combination of self-consuming installation capacities;

(f-1) the installation capacity configuration system calculating a self-consuming recovery period according to the self-consuming system cost and the energy saving cost, wherein the self-consuming recovery period represents the time when the self-consuming system cost equals to the energy saving cost;

(g-1) determining whether or not an expected self: consuming recovery period according to the user's requirement is larger than the self-consuming recovery period, if the expected self-consuming recovery period is smaller than or equals to the self-consuming recovery period, go back to step (c-I);

(h-1) determining whether all combinations of self-consuming installation capacities evaluated or not; if the determination result shows that there is the combination which is not evaluated, go back to step (c-I);

(c-2) the installation capacity configuration system evaluating a combination of selling installation capacities according to the selling installation capacity, the maximum installation capacities, and the capacity coefficients;

(d-2) the installation capacity configuration system calculating a selling system cost according to the combination of selling installation capacities;

(e-2) the installation capacity configuration system calculating a selling profit received by selling part of the power generated to a buyer according to the combination of the selling installation capacities;

(f-2) the installation capacity configuration system calculating a selling recovery period according to the selling system cost and the profit, wherein the selling recovery period represents the time which the selling system cost equals to the profit;

(g-2) determining whether an expected selling recovery period according to the user's requirement is larger than the selling recovery period, as the expected selling recovery period is smaller than or equals to the selling recovery period, go back to step (c-2);

(h-2) determining whether all combinations of the selling installation capacity associated with the hybrid energy generation system have been evaluated; as the identified result demonstrates that there are combinations which have not been processed, go back to step (c-2); and (i) taking the overall installation capacity combination which combines the combination of the self-consuming installation capacities with the minimum recovery period and the combination of the selling installation capacities with the minimum recovery period, as the optimized configuration option of the hybrid energy generation system, in correspondence with all combinations of the selling installation capacity and all combination of the self-consuming installation capacities haven been processed.

9. The method for configuring installation capacities of the hybrid energy generation system according to claim 8, wherein generating the combination of self-consuming installation capacities or the combination of the selling installation capacities a sum of a plurality of products which multiply each capacity coefficient of the power system to the corresponding installation capacity respectively is enough to supply the self-consuming installation capacity or the selling installation capacity, the formula is:

$$P = \sum i =_{1\sim M} fac_i * cap_i$$

wherein, P is the self-consuming installation capacity or the selling installation capacity, M is the number of the plurality of power systems, $fac_i$ is the capacity coefficient of the power system, and $cap_i$ is the installation capacity of the power system.

10. The method for configuring installation capacities of the hybrid energy generation system according to claim 8, wherein calculating the self-consuming system cost or the selling system cost means for calculating an installation cost, a maintenance fee, and a remaining value, the formula is:

$$\text{Cost} = \sum_{i=1}^{M} (I_i - S_{P_i} + OM_{P_i})$$

wherein, Cost is the self-consuming system cost or the selling system cost, M is the number of the plurality of power systems, $I_i$ is the installation cost of the power system, $S_{Pi}$ is the remaining value of the power system, and $OM_{Pi}$ is the maintenance fee of the power system;

the formula of the installation cost is:

$$I_i = \text{cost}_i * cap_i, i = 1 \sim M$$

wherein, $\text{cost}_i$ is the installation cost of the power system per one thousand watt, and $cap_i$ is the installation capacity of the power system;

the formula of the remaining value is:

$$S_{P_i} = k * cost_i * cap_i * \left(\frac{1+\beta}{1+\gamma}\right)^{N_P}$$

wherein, k is a ratio of a recovery value to an equipment cost, β represents an inflation rate, γ represents a bank interest rate, and $N_p$ is a system service life; and the formula of the maintenance fee is:

$$OM_{P_i} = q * cost_i * cap_i * \sum_{j=1}^{N_P} \left(\frac{1+v}{1+\gamma}\right)^j$$

wherein, q is the ratio of the maintenance fee to the equipment cost each year, and v represents the growing rate of the maintenance fee.

11. The method for configuring installation capacities of the hybrid energy generation system according to claim 8, wherein the plurality of power systems are combinations of at least two of the following consisting of a solar power generation system, a wind power generation a hydropower generation system, a geothermal power generation system, a biomass power system, a fuel cell power generation system, or an energy storage system.

12. The method for configuring installation capacities of the hybrid energy generation system according to claim 8, wherein the environmental parameter is either a combination or any one among a temperature, an illumination, a wind speed, a water flow, a water flow rate, a quantity of heat carrier, a geothermal temperature, a biomass volume, and a installation area of the power system.

13. The method for configuring installation capacities of the hybrid energy generation system according to claim 8, wherein the power system is an emergency backup power system, in which the installation capacity of the emergency backup power system is determined according to an amount of emergency power consumption with respect to the installation site conditions.

14. The method for configuring installation capacities of the hybrid energy generation system according to claim 8, wherein the energy saving cost is either one or a combination of a fine of exceeding contract power, a basic power fee, a flow power fee, and a fee of carbon dioxide reduction, the formula of the fine of exceeding contract power $M_p$ is:

$$M_{2p}=(sm_{cap\_cost}*sm_{mon}+wt_{cap_{cost}}*wt_{mon})*2*P_{2p}$$

$$M_{3p}=(sm_{cap\_cost}*sm_{mon}+wt_{cap_{cost}}*wt_{mon})*3*P_{2p}$$

$$M_p=M_{2p}+M_{3p}$$

wherein, $M_{2p}$ is two times of the penalty, $M_{3p}$ is three times of the penalty, $P_{7p}$ represents a power consumption amount within 110% of contract power, $P_{3p}$ represents a power consumption amount over 110% of contract power, $sm_{mon}$ represents a number of summer months, $wt_{mon}$ represents a number of winter months, $sm_{cap\_cost}$ represents a power cost every thousand watt during summer months, and $wt_{cap\_cost}$ represents a power cost every thousand watt during winter months;

the formula of the basic power fee $M_b$ is:

$$M_b=(sm_{cap\_cost}*sm_{mon}+wt_{cap\_cost}*wt_{mon})*(\Sigma_{i=1\sim M}P_i)$$

wherein, $P_i$ represents the actual power of each of the power systems, and M is the number of the plurality of power systems;

the formula of the flow power fee $M_f$ is:

$$M_f=\left(\sum_{i=1\sim M} P_i\right)*h*d*eg_{cost}$$

wherein, h represents the hours per day, d represents the days per year, $eg_{cost}$ represents an average price per one KWH, and the formula of the fee of carbon dioxide reduction $M_{CO2}$ is:

$$M_{CO_2}=\left(\sum_{i=1}^{M} P_i\right)*wg_{CO_2}*cost_{CO_2}*h*d$$

wherein, $cost_{CO2}$ represents a reduction cost for reducing carbon dioxide per ton, and $wg_{CO2}$ represents the amount of produced carbon dioxide per 1 KWH;

Wherein, the buyer is a power company and the formula of selling profit is:

$$Ri=P_i*b_i*h*d, i=1\sim M$$

Wherein $R_i$ is the selling profit of the power system, $b_i$ is the buying cost of power generated from the power system.

* * * * *